No. 811,038. PATENTED JAN. 30, 1906.
VAN WYCK A. CROSHIER.
AUTOMATIC ANIMAL FEEDER.
APPLICATION FILED NOV. 28, 1904.

2 SHEETS—SHEET 1.

Witnesses

Inventor
Van Wyck A. Croshier
by Lincoln Sonntag
Attorney

No. 811,038. PATENTED JAN. 30, 1906.
VAN WYCK A. CROSHIER.
AUTOMATIC ANIMAL FEEDER.
APPLICATION FILED NOV. 28, 1904.

2 SHEETS—SHEET 2.

Witnesses.

Inventor.
Van Wyck A. Croshier
by Lincoln Sonntag
Attorney

UNITED STATES PATENT OFFICE.

VAN WYCK A. CROSHIER, OF SAN FRANCISCO, CALIFORNIA.

AUTOMATIC ANIMAL-FEEDER.

No. 811,038. Specification of Letters Patent. Patented Jan. 30, 1906.

Application filed November 28, 1904. Serial No. 234,566.

*To all whom it may concern:*

Be it known that I, VAN WYCK A. CROSHIER, a citizen of the United States, residing at San Francisco, in the county of San Francisco and State of California, have invented certain new and useful Improvements in Automatic Animal-Feeders, of which the following is a specification.

My invention relates to improvements in automatic animal-feeders wherein by a certain novel construction and arrangement of parts grain is automatically released to flow into mangers for the feeding of horses and other herbivorous animals; and the objects of my improvements is to provide in a device as described a plurality of bins, pipes, hoppers, and other parts for the feeding of such animals at different hours at a single adjustment of the apparatus; to provide for the feeding of such animals of any desired quantity of grain; to prevent the wasting of grain in the filling of the mangers; to prevent the animals from securing grain at any but certain fixed times, so as to allow the feeding to them of other foods when they are in an improper condition for the eating of grain; to save the expense of the services of men to remain in barns to feed the animals at the desired hours.

I attain the objects aforesaid by a certain novel arrangement and construction of parts described in the following specification, illustrated in the accompanying drawings, and claimed as new in the appended claims.

Figure 1:
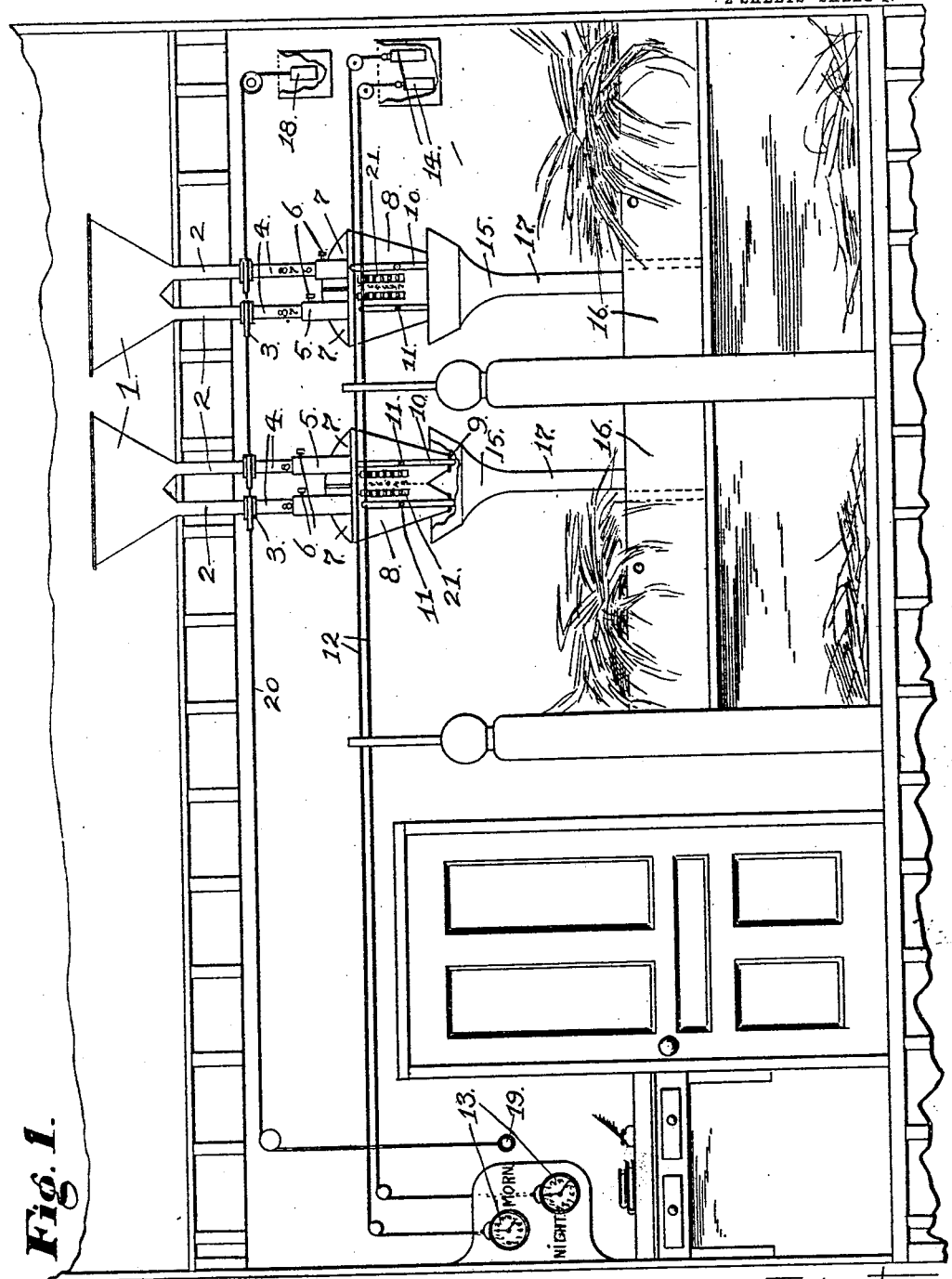
Figure 2:
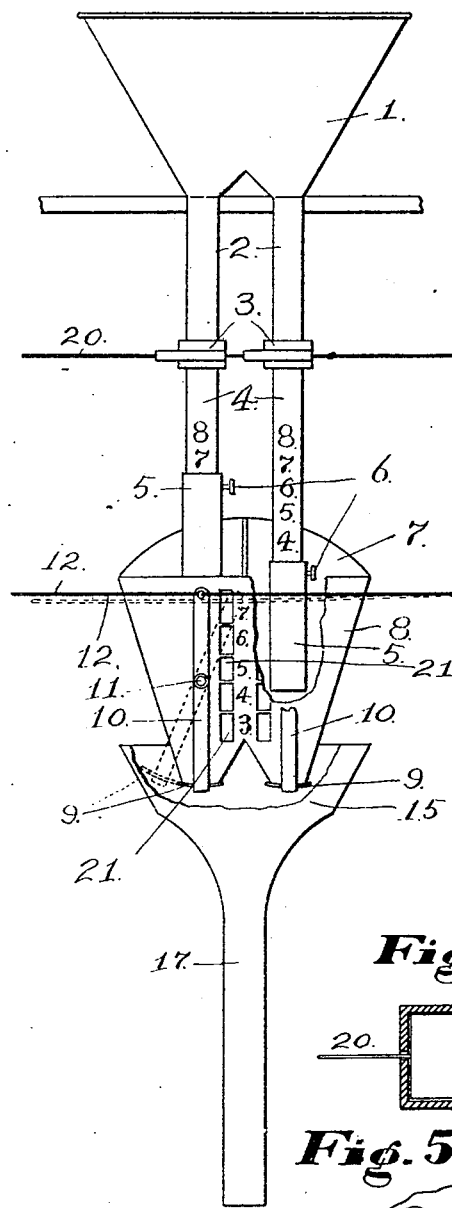
Figure 3:
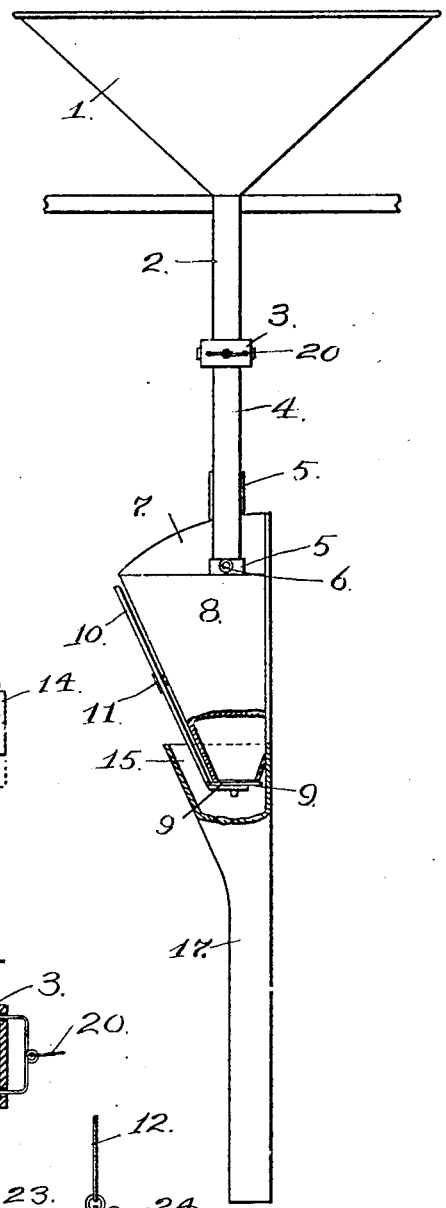
Figure 4:
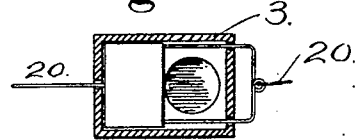
Figure 5:
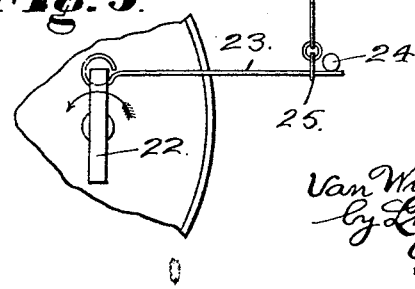

Referring to the said drawings, Figure 1 shows a front elevation of the apparatus and a general view of the manner of its application. Fig. 2 is an enlarged front view in detail of the apparatus. Fig. 3 is a side view of the apparatus shown in Fig. 2. Fig. 4 is a detail in section of the valve 3 hereinafter referred to; and Fig. 5 is a detail of the mechanism supporting the wire, rope, or chain 12.

In such figures, 1 represents the large bin on the upper floor of a barn or other structure wherein horses or other draft-animals are boarded or kept and from which grain flows through the pipe 2 to the common slide-valve 3, thence upon the opening of the valve through the same and the pipe or chute 4 and the sleeve gage 5, which is secured at desired position by the thumb-screw 6, into one of the double compartments of the hopper 8 and by which sleeve gage the exact amount of grain to be admitted into the hopper may be fixed. The further downward progress of the grain is stopped by the trap or slide 9, secured to the end of the lever 10, which is fulcrumed at point 11, and which slide is operated, through the lever 10, by means of the rope, wire, or chain 12, and which in turn is released by the set-stop on the alarm or time clock 13 and opened by means of the falling of the weight 14 on the end of the rope, wire, or chain 12. Thereupon the grain flows into the secondary hopper 15 and in the manger 16 by means of the pipe or chute 17, leading from said hopper 15 to the manger. The slide-valve 3 has a flat slide operated by the rope, wire, or chain 20, which has a ring 19 at its free end for the purpose of clasping and a weight 18 at the other end whereby the valve is kept normally closed.

21 shows a longitudinal opening covered by isinglass or other transparent or semitransparent material through which may be ascertained the height of the grain contained therein and the quantity of which may be definitely ascertained by the figures set opposite thereto at regular intervals as a measure thereof.

I prefer that one of the levers 11 should be longer than the other to prevent contact of the rope, wire, or chain.

The rear wall of hopper 8 has at its lower end a flanged inclined piece, such as shown in Fig. 3 near the point designated as 9, for preventing the vertical descent of grain to the floor of the building wherein the same is contained. The apparatus can be operated from any part of the barn and place where contained. Especially will it be found convenient to operate the same from the office of a livery-stable, the hopper being gaged and fed automatically from that point and any quantity of grain from one to eight quarts or other quantity fed to the manger. The clock mechanism to commence the automatic operation of the apparatus which I prefer is the attachment of a wire to the alarm-key of the alarm-clock. When the key turns, the wire is withdrawn and releases the chain, wire, or rope that has been held thereby, having at its other end a suspended weight, as shown in Fig. 1, and such weight falling the trap or slide 9 is opened, whereby the hopper 15 is filled with grain. 22 represents the alarm-key of an alarm-clock. 23 shows the said set-stop attached to said key and which is withdrawn by said key to release the rope, wire, or chain 12. 24 designates the pin to prevent the upward movement of said set-stop 23 before the turning of the key.

Having thus described my invention, what I claim as new, and desire to secure by Letters Patent, is—

1. In combination with a clock, a bin, a plurality of pipes descending therefrom, valves for opening or closing said pipes, sleeve gages securable over such pipes, a partitioned hopper having openings containing material for seeing the contents, movable slides for opening or closing the base of said hopper and means for the movement of said slides, substantially as described.

2. In combination with a clock, a plurality of pipes, a bin opening thereinto, slide-valves for opening or closing said pipes, sleeve gages securable over such pipes, a plurality of hoppers containing material for seeing the contents thereof, movable slides for opening or closing the bases of said hoppers and means for automatically opening such slides, substantially as described.

3. In combination with a clock a receptacle for grain having openings in its base, pipes descending from such openings, valves for opening or closing such pipes, cylinders movable longitudinally on said pipes, a plurality of hoppers having equidistant openings containing material for seeing the contents thereof, slides covering the open bases of said hoppers, levers and connections thereto for opening said slides, substantially as described.

4. In combination with a clock, a bin having openings in its base, pipes in connection with said bin, valves to open or close said pipes, adjustable sleeves partly covering said pipes, a partitioned hopper having equidistant openings containing material for seeing its contents, levers of unequal length connected to slides to open, or close the base of said hopper and means for the movement of said levers substantially as described.

5. In combination with a clock a bin having openings at its base, pipes leading therefrom, cylinders telescoping on such pipes and securable thereto, a partitioned hopper penetrable by said hoppers, a plurality of levers fulcrumed to said cylinders, slides sustained by said levers and movable laterally, and cords and weights arranged to be released by the clock for the operation of such levers and slides, substantially as described.

6. In combination with a clock, a receptacle for holding grain, said receptacle having orifices for discharging the grain into hoppers beneath the same, means for regulating the amount of grain so discharged, hoppers having translucent openings in their sides for ascertaining the amount of grain therein and said hoppers also having orifices at their bases, slides covering said orifices, and levers and connections for automatically moving said slides for discharging the grain and for closing the same substantially as described.

7. In combination with a clock, a bin and pipes leading therefrom, valves for opening and closing said pipes, cylinders telescoping on such pipes and adjustable thereon, a plurality of hoppers penetrable by said cylinders, slides for opening and closing the open bases of said hoppers, means for operating said slides, and a hopper having a chute leading to a manger, substantially as described.

8. In an automatic animal-feeder the combination of a receptacle for grain having openings at its base, pipes leading from such receptacle, valves for opening and closing such pipes, adjustable sleeves upon such pipes, a plurality of hoppers beneath such sleeves, slides for opening and closing the open bases of said hoppers, levers and connections for the movement of said slides, substantially as described.

9. In an automatic animal-feeder, the combination of a main receptacle opening into pipes leading therefrom, valves in said pipes and means for moving the same, adjustable sleeves upon said pipes, a plurality of hoppers having openings in each penetrable by one of such sleeves, means for automatically opening and for closing the bases of said hoppers, and a receptacle leading from such bases, substantially as described.

In testimony whereof I affix my signature in presence of two witnesses.

VAN WYCK A. CROSHIER.

Witnesses:
JOHN NIESS,
L. SONNTAG.